A. GODFREY.
VEHICLE BRAKE.
APPLICATION FILED JAN. 3, 1908.
910,123.
Patented Jan. 19, 1909.
2 SHEETS—SHEET 1.
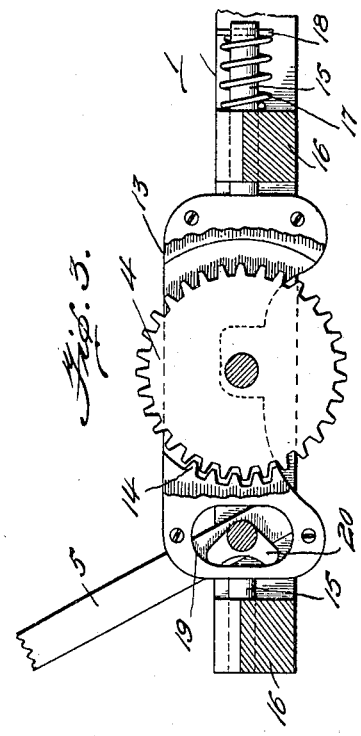
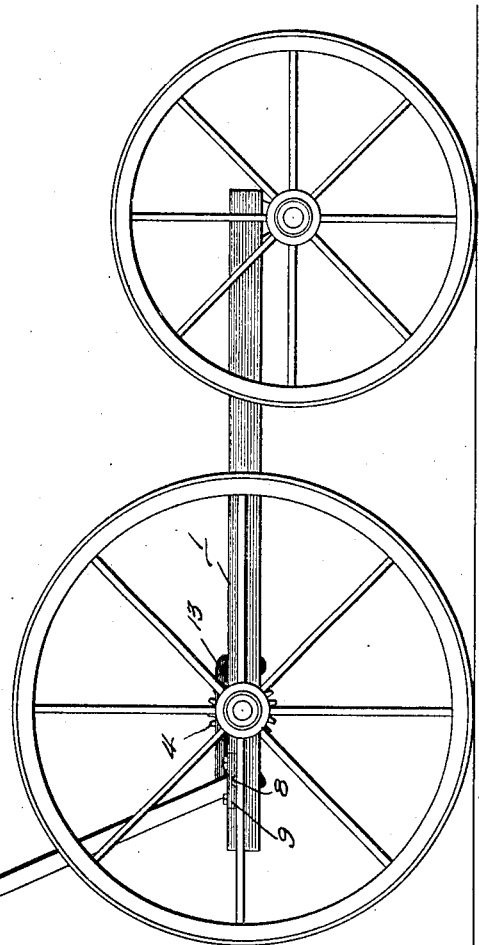
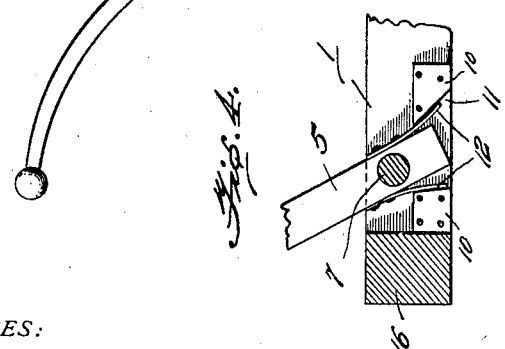
WITNESSES:
Alexander Godfrey,
INVENTOR.
BY
ATTORNEY.

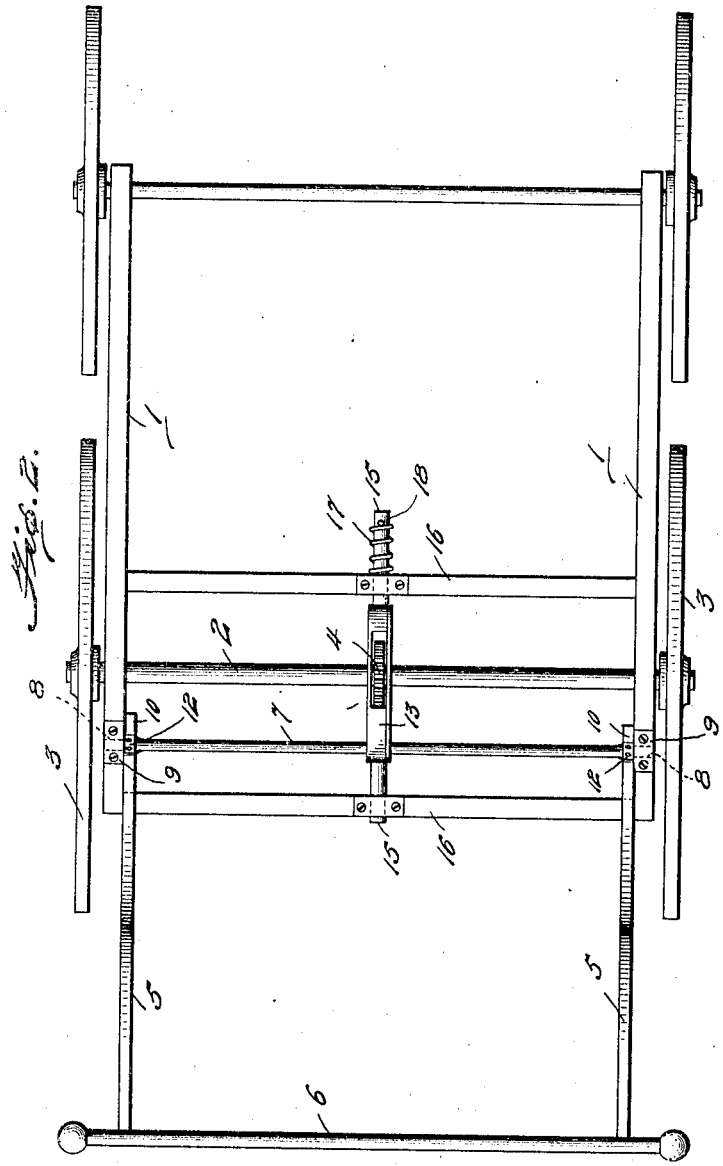

UNITED STATES PATENT OFFICE.

ALEXANDER GODFREY, OF BRADFORD, MASSACHUSETTS, ASSIGNOR TO AUTOMATIC BRAKE COMPANY, OF HAVERHILL, MASSACHUSETTS, A CORPORATION OF MASSACHUSETTS.

VEHICLE-BRAKE.

No. 910,123.   Specification of Letters Patent.   Patented Jan. 19, 1909.

Application filed January 3, 1908. Serial No. 409,197.

*To all whom it may concern:*

Be it known that I, ALEXANDER GODFREY, a citizen of the United States, residing at Bradford, in the county of Essex and State of Massachusetts, have invented certain new and useful Improvements in Vehicle-Brakes, of which the following is a specification.

My invention relates to improvements in vehicle brakes, and refers in particular to a braking device for baby carriages and the like which will be automatically set to hold the vehicle stationary when the propelling force is not being applied. The device is thus in the nature of a safety appliance to prevent "runaways" and the like accidents.

Another object of the invention is the provision of a simple, practical and inexpensive form of braking device for vehicles which will be proficient for the purposes above set forth, and one which may be readily adapted and applied to various kinds of vehicles.

With the above and other objects in view, my invention comprises in the combination with the running gear of a vehicle, and a frictional member operated thereby, a brake block and means for holding the same in engagement with the frictional member when the vehicle is not being propelled, and means for holding the brake block inactive when the vehicle is being propelled.

My invention further consists of a vehicle brake embodying certain other novel features of construction, combination and arrangement of parts substantially as disclosed herein and as illustrated in the accompanying drawings, in which:

Figure 1, is a side elevation of the running gear of a vehicle equipped with my improvements. Fig. 2, is a top plan view of the same. Fig. 3, is a broken sectional view of the cam mechanism for operating the brake block or clutch, and the brake or clutch mechanism itself. Fig. 4, is a broken detail view of the spacing mechanism for holding the propelling handle in proper position.

In the accompanying drawings I have shown my invention as applied to a baby carriage, but of course it will be understood that it may be adapted as well to vehicles of other sorts.

In the drawings: The numeral 1, designates the running gear and 2, one of the axles which is journaled to the frame of the running gear and carries upon its ends the relatively fixed pair of wheels 3. This axle thus rotates with the wheels and it has affixed upon it the friction disk or member 4. This member preferably has a toothed periphery as shown but it may be left plain if so desired. The handle for propelling the carriage comprises the two side rods or members 5, connected at the top by the handle bar 6, and near the lower ends by the cross brace 7. The ends of the lower cross bar or brace are prolonged to form pintles 8, which are journaled in the bearings 9, carried by the running gear of the frame. Stop blocks 10, are carried by the frame and are each provided with an angular seat or recess 11, to receive the lower ends of the side rods of the handles. Angular springs 12, are secured to opposite sides at the lower ends of these side rods, and these springs are set on a downwardly flaring incline to engage the angular side walls of the seats in the stop blocks to hold the handle normally upright.

The clutching or braking device comprises a hollow shoe or block 13, which fits over the friction disk on the axle and is provided with teeth 14, to intermesh with the teeth on the disk. The brake block has guiding extensions 15, at each end which are slidably engaged in the cross braces 16 of the frame. A spiral spring 17, engaged on the extended end of the brake block extension between the abutment 18, on the end of said extension and the cross brace, serves to force the block in engagement with the friction disk thereby normally holding the parts locked with the brake set. A vertically arranged slot or recess 19, is provided in the rear portion of the brake block which receives the cam 20, on the lower cross bar 7. This cam is adapted when the cross bar is rocked in either direction, to engage the wall of the seat in the brake block and force the block against the action of the spring out of engagement with the friction disk on the axle. From this it will be seen that the springs on the lower ends of the handle rods serve to hold such rods normally upright and in this normal position as when the vehicle is stationary, the brake is automatically held locked or set. As soon as pressure is applied to the handle bar to push or pull the vehicle the handle as a whole rocks upon the pintles and the cam carried by the rock shaft forces the brake block over and out of engagement with the friction member on the axle and the vehicle is free to be propelled in either direction. The stop blocks limit the rocking movement of the handle. As soon as the propelling force stops, the brake or clutch is instantly and automatically applied so that all danger of accidents is obviated.

From the foregoing description taken in connection with the drawings it will be evident that I have produced a vehicle brake which fully and satisfactorily accomplishes all the objects herein aimed at.

I claim:

1. The combination with a vehicle and connections for propelling the same, a pivotal support for the propelling means a friction member rotated from the wheels of the vehicle, a spring pressed brake block normally held in engagement with the friction member and cam mechanism carried by the pivotal support of the propelling means bearing on the brake block for releasing the block from engagement with the friction member.

2. The combination with a vehicle and a rock shaft journaled thereto, a handle carried by the rock shaft, a friction disk mounted on one of the axles of the vehicle, a brake block adapted to engage said friction disk, a spring for normally holding the block in engagement with the disk, and a cam on the rock shaft seated in a recess in the brake block to force the brake block out of engagement with the friction disk when propelling force is applied to the handle.

3. In combination with a vehicle or like device, a handle pivoted thereto, means for limiting the pivotal movement of the handle and for holding the handle normally in a certain position, a friction member operable upon the moving of the vehicle or device, a brake block normally held in engagement with the friction member, and a cam carried by the pivotal support of the handle seated in a recess in the brake block and adapted to force the brake block out of engagement with the friction member.

4. A baby carriage brake comprising a cogged disk, a spring pressed brake block provided with cogs to intermesh with those of the friction disk, a rock shaft and a handle mounted thereon, springs on the lower end of the handle, stops engaged by said springs to space the handle between said stops and limit the pivotal movement of the handle, and a double ended cam on the rock shaft seated in a recess in the brake block to force the brake block from engagement with the disk when power is applied to the handle.

5. In combination with a vehicle, a handle pivoted thereto, a friction member operable upon the moving of the vehicle, a brake block normally held in engagement with the friction member, and a cam carried by the pivotal support of the handle engaging the brake block to force said brake block out of engagement with the friction member.

6. The combination with a vehicle, propelling means for the vehicle pivotally connected therewith, a friction member, a brake block normally held in engagement with the friction member, and a cam carried by the pivotal support of the propelling means to force the brake block from engagement with the friction member.

In testimony whereof I affix my signature, in presence of two witnesses.

ALEXANDER GODFREY.

Witnesses:
FREDERICK W. MILLAY,
WM. LAUGHLIN.